(12) United States Patent
Hitomi et al.

(10) Patent No.: US 6,372,852 B2
(45) Date of Patent: *Apr. 16, 2002

(54) WATER-ABSORBING COMPOSITION AND PRODUCTION PROCESS FOR WATER-ABSORBING AGENT

(75) Inventors: Kazuhisa Hitomi; Yuji Yamamoto; Shigenori Kirimura, all of Himeji; Nobuyuki Harada, Suita, all of (JP)

(73) Assignee: Nippon Shokubai Co., Ltd, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/273,668

(22) Filed: Mar. 23, 1999

(30) Foreign Application Priority Data

Mar. 31, 1998 (JP) ............................................ 10-085235

(51) Int. Cl.[7] ...................... C08F 261/06; C08F 261/12; C08F 8/00; C08G 63/48; C08G 63/91
(52) U.S. Cl. .......................... 525/312; 525/50; 525/55; 525/242; 525/243; 525/244; 525/298; 525/330.6
(58) Field of Search ............................ 525/50, 55, 242, 525/243, 244, 298, 312, 330.6

(56) References Cited

U.S. PATENT DOCUMENTS 4,165,743 A    8/1979   Denning 5,169,904 A  * 12/1992  Ziemelis et al. .......... 525/330.2
5,369,164 A  * 11/1994  Kroener et al. .............. 525/312
5,610,208 A  *  3/1997  Dairoku et al. ........... 525/330.6

FOREIGN PATENT DOCUMENTS

| | | |
|---|---|---|
| EP | 0 288 865 | 11/1988 |
| EP | 0 454 497 | 10/1991 |
| EP | 0 513 780 | 11/1992 |
| EP | 0 629 411 | 12/1994 |
| EP | 0 692 514 | 1/1996 |
| EP | 0 738 758 | 10/1996 |
| EP | 0 807 646 | 11/1997 |
| GB | 645088 | 10/1950 |
| JP | 61252212 | 11/1986 |
| JP | 62036410 | 2/1987 |
| JP | 62036411 | 2/1987 |
| JP | 01126314 | 5/1989 |
| JP | 02153903 | 6/1990 |
| JP | 08027278 | 1/1996 |

* cited by examiner

Primary Examiner—Patrick D. Niland

(57) ABSTRACT

The present invention has an object to provide a process for producing a water-absorbing agent which is excellent in the absorption capacities under no load and under a load with good balance and can display excellent absorption properties even if the weight percentage of a water-absorbent resin (resin concentration) is high when the water-absorbent resin is used for materials such as sanitary materials. The above object can be achieved by adding a vinyl compound or both the vinyl compound and a polyhydric alcohol to a water-absorbent resin and heating the resultant mixture.

15 Claims, No Drawings

WATER-ABSORBING COMPOSITION AND PRODUCTION PROCESS FOR WATER-ABSORBING AGENT

BACKGROUND OF THE INVENTION

A. Technical Field

The present invention relates to a production process for a water-absorbing agent which is favorably used for sanitary materials such as paper-made diapers (disposable diapers), sanitary napkins and so-called incontinent pads.

B. Background Art

In recent years, water-absorbent resins that are hydrophilic resins are widely used as constituent materials of sanitary materials, such as disposable diapers, sanitary napkins, and so-called incontinent pads, for the purpose of causing the water-absorbent resins to absorb body fluids.

Known examples of the above water-absorbent resins are as follows: crosslinked products of partially neutralized polyacrylic acids; hydrolyzed products of starch-acrylic acid graft polymers; saponified products of vinyl acetate-acrylic acid ester copolymers; hydrolyzed products of acrylonitrile- or acrylamide copolymers, and their crosslinked products; and crosslinked polymers of cationic monomers.

Examples of the properties which the above water-absorbent resins should have are as follows: upon contact with aqueous liquids such as body fluids, excellent water absorption amount or speed, the liquid permeability, the gel strength of the swollen gel, the suction power to suck up water from a base material containing aqueous liquids. However, relations between these properties do not necessarily display positive correlations. For example, as the absorption capacity under no load increases, the absorption properties under a load deteriorate.

As to a method for improving such water-absorption properties of the water-absorbent resin in good balance, there is a known art in which the neighborhood of the surface of the water-absorbent resin is crosslinked, and various methods have been proposed as such.

For example, there are known methods in which the following materials are used as the crosslinking agents: polyhydric alcohols (JP-A-58-180233 and JP-A-61-016903); polyglycidyl compounds, polyaziridine compounds, polyamine compounds, or polyisocyanate compounds (JP-A-59-189103); glyoxal (JP-A-52-117393); polyvalent metals (JP-A-51-136588, JP-A-61-257235 and JP-A-62-007745); silane coupling agents (JP-A-61-211305, JP-A-61-252212, and JP-A-61-264006); alkylene carbonates (DE 4020780). In addition, there are also known methods in which the following materials are allowed to be present as third substances for the purpose of improving the dispersibility of the crosslinking agent when the crosslinking agent is mixed or when the crosslinking reaction is carried out: inert inorganic powders (JP-A-60-163956 and JP-A-60-255814); dihydric alcohols (JP-A-01-292004); water along with ether compounds (JP-A-02-153903); alkylene oxide adducts of monohydric alcohols, organic acid salts, lactams, and so on (EP 555692); and phosphoric acid (Publication of Internal Patent Application as entered the national phase in Japan (Kohyo) No. 08-508517).

However, there are cases where conventional arts of crosslinking the neighborhood of the surface of the water-absorbent resin cannot sufficiently meet the abilities as recently demanded to the water-absorbent resin to a high degree. For example, in recent years, the sanitary materials have a tendency to be designed to be thinned, so the water-absorbent resin concentration in the absorbent structure becomes high. Thus, excellent absorption capacities under no load and under a heavy load with good balance are exemplified as the properties that are desired to the water-absorbent resin in the absorbent structure which contains the water-absorbent resin in a large quantity, namely, high concentration, but the above conventional methods are still insufficient to further raise each of the above values.

Furthermore, there is a problem of the safety of the crosslinking agent as used. Generally, when the crosslinking agent has high reactive groups such as epoxy group, the crosslinking agent itself has property to stimulate skin. Thus, not only considering problems on environment of working, but also considering the application to sanitary materials, it is necessary to strictly control factors such as the amount of the crosslinking agent remaining in the resin, and further, complicated operations in the process are necessary for also decreasing the amount of the residual crosslinking agent. Therefore, in fact, the art (for obtaining water-absorbent resins as preferably used for sanitary materials) which is satisfactory with regard to the performance, the safety, and the process is still insufficient.

SUMMARY OF THE INVENTION

A. Object of the Invention

The present invention was made considering the above problems on the prior arts, and it is an object of the present invention to provide a new production process for a water-absorbing agent which is excellent in the absorption capacities under no load and under a load with good balance and can display excellent absorption properties even if the weight percentage of the water-absorbent resin (resin concentration) is high when the water-absorbent resin is used for materials such as sanitary materials.

B. Disclosure of the Invention

The present inventors studied and studied about a production process of a water-absorbing agent with encouragement to themselves and great efforts to achieve the above objects. As a result, the inventors completed the present invention by finding that the aimed water-absorbing agent (which is excellent in the absorption capacities under no load and under a load with good balance and can display excellent absorption properties even if the resin concentration is high when the water-absorbent resin is used for materials such as sanitary materials) can be produced by adding a vinyl compound to a water-absorbent resin and heating the resultant mixture.

Therefore, a production process for a water-absorbing agent, according to the present invention, is characterized by comprising the steps of adding a vinyl compound or both the vinyl compound and a polyhydric alcohol to a water-absorbent resin and heating the resultant mixture.

These and other objects and the advantages of the present invention will be more fully apparent from the following detailed disclosure.

DETAILED DESCRIPTION OF THE INVENTION

The water-absorbent resin, which is used as the hydrophilic resin to produce the water-absorbing agent of the present invention, is a conventionally known resin that absorbs as large a quantity of water as 50~1,000 times the original in ion-exchange water to thereby form a hydrogel.

Particularly, those which have a carboxyl or hydroxyl group are preferable, and those which have a carboxyl group are more preferable. The water-absorbent resin is typically obtainable by polymerizing and crosslinking hydrophilic monomers of which the main component is either one or both of acrylic acid and a salt (neutralized product) thereof. In addition, as to the above water-absorbent resin, those which have an uncrosslinked water-soluble content of 25 weight % or below, preferably 15 weight % or below, more preferably 10 weight % or below, are used.

Examples of the above salt of acrylic acid include: alkaline metal salts, ammonium salts, and amine salts of acrylic acid. It is preferable that the constituent units of the above water-absorbent resin comprise acrylic acid of 10~40 mol % and its salt of 90~60 mol % (wherein the total of both is 100 mol %). The monomers, as used to produce the water-absorbent resin by polymerizing hydrophilic monomers (of which the main component is either one or both of acrylic acid and a salt thereof), may, if necessary, comprise not only acrylic acid or a salt thereof, but also monomers other than acrylic acid.

The monomers other than acrylic acid are not especially limited, but specified examples of them include: anionic unsaturated monomers, such as methacrylic acid, maleic acid, vinylsulfonic acid, styrenesulfonic acid, 2-(meth) acrylamido-2-methylpropanesulfonic acid, 2-(meth) acryloylethanesulfonic acid, and 2-(meth) acryloylpropanesulfonic acid, and their salts; nonionic unsaturated monomers containing a hydrophilic group, such as acrylamide, methacrylamide, N-ethyl (meth)acrylamide, N-n-p ropyl(meth)acrylamide, N-isopropyl(meth) acrylamide, N,N-dimethyl(meth)acrylamide, 2-hydroxyethyl (meth)acrylate, 2-hydroxypropyl (meth) acrylate, methoxypolyethylene glycol (meth)acrylate, polyethylene glycol mono(meth)acrylate, vinylpyridine, N-vinylpyrrolidone, N-acryloylpiperidine, and N-acryloylpyrrolidine; cationic unsaturated monomers such as N,N-dimethylaminoethyl (meth)acrylate, N,N-diethylaminoethyl (meth)acrylate, N,N-dimethylaminopropyl (meth)acrylate, N,N-dimethylaminopropyl(meth)acrylamide, and their quaternary salts. These monomers may be used either alone respectively or in combinations with each other.

In the present invention, when the monomers other than acrylic acid are used, the ratio of them is preferably 30 mol % or below, more preferably 10 mol % or below, of the total with acrylic acid and its salt. If the above monomers other than acrylic acid are used in the above ratio, then the water-absorption properties of the resultant water-absorbent resin are still more improved, and the water-absorbent resin is obtainable at a still lower cost.

When the above hydrophilic monomer (of which the main component is acrylic acid or a salt thereof) is, for example, polymerized to obtain the water-absorbent resin as used in the present invention, bulk polymerization or precipitation polymerization can be carried out. However, considering the performance or the easiness of the polymerization control, it is preferable to carry out aqueous solution polymerization or reversed-phase suspension polymerization using the above hydrophilic monomer in the form of its aqueous solution. Incidentally, when the monomer is used in the form of its aqueous solution, the concentration of the monomer in its aqueous solution (hereinafter referred to as "aqueous monomer solution") is not especially limited, but is preferably in the range of 10~70 weight %, more preferably 20~42 weight %. In addition, when the above aqueous solution polymerization or reversed-phase suspension polymerization is carried out, a solvent other than water may be jointly used if necessary, and the kind of the solvent as jointly used is not especially limited.

When the above polymerization is initiated, the following radical polymerization initiators, for example, can be used: potassium persulfate, ammonium persulfate, sodium persulfate, t-butyl hydroperoxide, hydrogen peroxide, and 2,2'-azobis(2-amidinopropane) dihydrochloride.

Furthermore, a redox initiator is also available by further using a reductant to promote decomposition of the above polymerization initiator and combining both with each other. Examples of the above reductant include: (bi)sulfurous acid (or its salts) such as sodium sulfite and sodium hydrogensulfite; L-ascorbic acid (or its salts); reducible metals (or their salts) such as ferrous salts; and amines. However, the reductant is not especially limited to them.

The amount of the above polymerization initiator as used is in the range of usually 0.001~2 mol %, preferably 0.01–0.1 mol %. In the case where the amount of the polymerization initiator is less than 0.001 mol %, there are disadvantages in that a large amount of monomers remain unreacted, so the amount of monomers, remaining in the resultant water-absorbent resin, increases. On the other hand, in the case where the amount of the polymerization initiator exceeds 2 mol %, there might be disadvantages in that the water-soluble content in the resultant water-absorbent resin increases.

In addition, the polymerization reaction may be initiated by irradiating the reaction system with active energy rays, such as radiations, electron beam, and ultraviolet rays, instead of using the polymerization initiators. Incidentally, the reaction temperature in the above polymerization reaction is not especially limited, but is preferably in the range of 10~90° C. In addition, the reaction time is not especially limited either and may fitly be set according to factors such as the respective kinds of the hydrophilic monomers and polymerization initiators and the reaction temperature.

The water-absorbent resin, used in the present invention, may be a self-crosslinking type using no crosslinking agent, but preferable ones are those which are copolymerized or reacted with an internal-crosslinking agent having two or more polymerizable unsaturated groups or two or more reactive groups per molecule.

Specified examples of the above internal-crosslinking agent include: N,N -methylenebis(meth)acrylamide, (poly) ethylene glycol (meth)acrylate, (poly)propylene glycol di(meth )acrylate, trimethylolpropane tri(meth)acrylate, glycerol tri(meth)acrylate, glycerol acrylate methacrylate, ethylene-oxide-denatured trimethylolpropane tri(meth) acrylate, pentaerythritol hexa(meth)acrylate, triallyl cyanurate, triallyl isocyanurate, triallyl phosphate, triallylamine, poly(meth)allyloxyalkanes, (poly)ethylene glycol diglycidyl ether, glycerol diglycidyl ether, ethylene glycol, polyethylene glycol, propylene glycol, glycerol, pentaerythritol, ethylenediamine, ethylene carbonate, propylene carbonate, polyethylenimine, and glycidyl (meth) acrylate.

These internal-crosslinking agents may be used either alone respectively or in combinations with each other. In addition, these internal-crosslinking agents may be added to the reaction system either all at once or divisionally. When two or more kinds of internal-crosslinking agents are used, it is preferable to essentially use a compound with two or more polymerizable unsaturated groups, considering the water absorption properties of the resultant water-absorbent resin.

The amount of the above internal-crosslinking agent as used is in the range of preferably 0.005~5 mol %, more preferably 0.01~2 mol %, of the above hydrophilic monomers. In the respective cases where the amount of the internal-crosslinking agent is smaller than 0.005 mol % and where the amount of the internal-crosslinking agent exceeds 5 mol %, the water-absorbent resin having the desired water absorption properties might not be obtained.

When the crosslinking structure is introduced into the internal portion of the water-absorbent resin using the above internal-crosslinking agent, the internal-crosslinking agent may be added to the reaction system during or after polymerization, or after polymerization and neutralization, of the above hydrophilic monomers.

Incidentally, in the above polymerization, the following materials may be added to the reaction system: various foaming agents such as carbonates (or hydrogencarbonates), carbon dioxide, azo compounds, and inert organic solvents; hydrophilic polymers such as starch, cellulose, their derivatives, polyvinyl alcohol, polyacrylic acid (or its salts), and crosslinked products of polyacrylic acid (or its salts); various surface-active agents; and chain transfer agents such as hypophosphorous acid (or its salts).

When the water-absorbent resin as obtained by the above polymerization reaction is a gel, the above water-absorbent resin is usually dried and, if necessary, pulverized.

The water content of the water-absorbent resin, usable in the present invention, is not especially limited, but is in the range of usually about 400 weight % or below, preferably 0.1~40 weight % (but not including 40 weight %), more preferably 0.1~10 weight %.

In addition, the form of the water-absorbent resin, usable in the present invention, may be a gel over 1,000 $\mu$m in terms of average particle diameter that is obtained by the polymerization reaction and has not been dried or pulverized yet. However, the water-absorbent resin comprises particles with a particle diameter in the range of usually 10~1,000 $\mu$m, preferably 50~800 $\mu$m, more preferably 75~700 $\mu$m (but not including 75 $\mu$m), particularly preferably 150~600 $\mu$m (but not including 150 $\mu$m), on the average after drying. The particle shape of the water-absorbent resin, for example, may be spherical, pulverized, or irregular, and is not especially limited, but those which have the irregular pulverized shapes, as obtained via the pulverization step, are preferably used. In addition, water-absorbent resin particles, more preferably usable in the present invention, have an average particle diameter in the above range and substantially do not contain either particles with a particle diameter of 850 $\mu$m or above, or particles with a particle diameter of 150 $\mu$m or below.

The present invention can be achieved by adding a vinyl compound or both the vinyl compound and a polyhydric alcohol to a water-absorbent resin and heating the resultant mixture, wherein the water-absorbent resin is obtainable by the above polymerization.

Examples of the vinyl compound, usable in the present invention, include: monovinyl ether compounds such as methyl vinyl ether, n-propyl vinyl ether, isopropyl vinyl ether, n-butyl vinyl ether, isobutyl vinyl ether, t-butyl vinyl ether, t-amyl vinyl ether, ethylhexyl vinyl ether, dodecyl vinyl ether, octadecyl vinyl ether, cyclohexyl vinyl ether, ethylene glycol monovinyl ether, ethylene glycol butyl vinyl ether, butanediol monovinyl ether, hexanediol monovinyl ether, diethylene glycol monovinyl ether, triethylene glycol monovinyl ether, triethylene glycol methyl vinyl ether, aminopropyl vinyl ether, diethylaminoethyl vinyl ether, cyclohexanedimethanol monovinyl ether, polyethylene glycol monovinyl ether, polyethylene glycol methyl vinyl ether, and propenyl ether propylene carbonate; polyvinyl ether compounds such as butanediol divinyl ether, cyclohexanedimethanol divinyl ether, ethylene glycol divinyl ether, diethylene glycol divinyl ether, triethylene glycol divinyl ether, trimethylolpropane trivinyl ether, hexanediol divinyl ether, tetraethylene glycol divinyl ether, and polyethylene glycol divinyl ether; unsaturated carboxylic acid compounds such as acrylic acid and maleic acid; unsaturated hydrocarbon compounds such as isobutylene, butene, pentene, and hexene; aromatic vinyl compounds such as divinylbenzene and styrene; conjugated diene compounds such as butadiene, isoprene, and pentadiene; allyl compounds such as allyl alcohol and trimethylolpropane triallyl ether; and vinyl compounds such as vinyl acetate and vinyl chloride. Particularly, it is more preferable to use a vinyl ether compound, selected from monovinyl ether compounds and polyvinyl ether compounds, as the compound for obtaining the water-absorbing agent which is excellent in both absorption capacities under no load and under a load (these excellent properties are effects of the present invention).

The amount of the vinyl compound, as used in the present invention, is usually in the range of 0.001~10 weight parts per 100 weight parts of the water-absorbent resin. The amount exceeding 10 weight parts is unfavorable, because such a large amount is not only uneconomical, but also makes a large amount of vinyl compound remain. Furthermore, the amount smaller than 0.001 weight part is unfavorable, because such a small amount makes it difficult to obtain an effect of improving the abilities, such as absorption capacity under a load, of the water-absorbing agent.

Examples of the polyhydric alcohol, usable in the present invention, include ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerol, polyglycerol, 2-butene-1,4-diol, 1,3-butanediol, 1,4-butanediol, 1,5-pentanediol, 1,6-hexanediol, 1,2-cyclohexanedimethanol, 1,2 cyclohexanol, trimethylolpropane, diethanolamine, triethanolamine, polyoxypropylene, oxyethylene-oxypropylene block copolymers, pentaerythritol and sorbitol.

The amount of the polyhydric alcohol, usable in the present invention, is usually in the range of 0.001~10 weight parts per 100 weight parts of the water-absorbent resin. The amount exceeding 10 weight parts is unfavorable, because such a large amount is not only uneconomical, but also makes a large amount of polyhydric alcohol remain. Furthermore, the amount smaller than 0.001 weight part is unfavorable, because such a small amount makes it difficult to obtain an effect of improving the abilities, such as absorption capacity under a load, of the water-absorbing agent.

In the present invention, when the vinyl compound or both the vinyl compound and the polyhydric alcohol are added to the water-absorbent resin, water is usable as a solvent. The amount of water, as used, is different according to factors such as the kind, particle diameter, or water content of the water-absorbent resin, but is in the range of preferably 0–20 weight parts (but not including zero), more preferably 0.5~10 weight parts.

In addition, when the vinyl compound, the polyhydric alcohol, or their aqueous solution is added to the water-absorbent resin, hydrophilic organic solvents (as the solvent) or third substances may be used to raise the miscibility.

When the hydrophilic organic solvent is used, examples thereof include: lower alcohols such as methyl alcohol, ethyl alcohol, n-propyl alcohol, isopropyl alcohol, n-butyl alcohol, isobutyl alcohol, and t-butyl alcohol; ketones such as acetone; ethers such as dioxane, tetrahydrofuran, and methoxy(poly)ethylene glycol; amides such as ε-caprolactam and N,N-dimethylformamide; sulfoxides such as dimethyl sulfoxide; polyhydric alcohols such as ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerol, polyglycerol, 2-butene-1,4-diol, 1,3-butanediol, 1,4-butanediol, 1,5-pentanediol, 1,6-hexanediol, 1,2-cyclohexanedimethanol, 1,2-cyclohexanol, trimethylolpropane, diethanolamine, triethanolamine, polyoxypropylene, oxyethylene-oxypropylene block copolymers, pentaerythritol, and sorbitol.

The amount of the hydrophilic organic solvent as used is different according to factors such as the kind, particle diameter, or water content of the water-absorbent resin, but is preferably 20 weight parts or below, more preferably in the range of 0.1~10 weight parts, per 100 weight parts of the solid content of the water-absorbent resin.

In addition, inorganic acids, organic acids, or polyamino acids, as disclosed in EP 0668080, as well as the aforementioned inert inorganic powders may be allowed to coexist as third substances.

A surface-crosslinking agent with two or more functional groups reactable upon the water-absorbent resin may further be used if it does not hinder the effects of the present invention. Examples of the surface-crosslinking agent include: polyhydric alcohol compounds such as ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerol, polyglycerol, 2-butene-1,4-diol, 1,3-butanediol, 1,4-butanediol, 1,5-pentanediol, 1,6-hexanediol, 1,2-cyclohexanedimethanol, 1,2-cyclohexanol, trimethylolpropane, diethanolamine, triethanolamine, polyoxypropylene, oxyethylene-oxypropylene block copolymers, pentaerythritol and sorbitol; epoxy compounds such as ethylene glycol diglycidyl ether, polyethylene diglycidyl ether, glycerol polyglycidyl ether, diglycerol polyglycidyl ether, polyglycerol polyglycidyl ether, propylene glycol diglycidyl ether, polypropylene glycol diglycidyl ether and glycidol; polyamine compounds, such as ethylenediamine, diethylenetriamine, triethylenetetraamine, tetraethylenepentaamine, pentaethylenehexaamine and polyethylenimine, and their inorganic or organic salts (for example, azetidinium salts); polyisocyanate compounds such as 2,4-tolylene diisocyanate and hexamethylene diisocyanate; polyoxazoline compounds such as 1,2-ethylenebisoxazoline; alkylene carbonate compounds such as 1,3-dioxolan-2-one, 4-methyl-1,3-dioxolan-2-one, 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4-methyl-1,3-dioxan-2-one, 4,6-dimethyl-1,3-dioxan-2-one and 1,3-dioxopan-2-one; haloepoxy compounds, such as epichlorohydrin, epibromohydrin and cc-methylepichlorohydrin, and their polyamine adducts (for example, Kymene made by Hercules: registered trademark); silane coupling agents such as γ-glycidoxypropyltrimethoxysilane and γ-aminopropyltriethoxysilane; and polyvalent metallic compounds such as hydroxides and chlorides of zinc, calcium, magnesium, aluminum, iron and zirconium.

In the present invention, when the vinyl compound or both the vinyl compound and the polyhydric alcohol are added to the water-absorbent resin, it is, for example, permissible to add the vinyl compound or both the vinyl compound and the polyhydric alcohol to a dispersion as prepared by dispersing the water-absorbent resin into the above hydrophilic organic solvent. In a preferable method, however, the vinyl compound or both the vinyl compound and the polyhydric alcohol (if necessary, in the form of solution or dispersion with either one or both of water and the hydrophilic organic solvent) are added to the water-absorbent resin by directly spraying or dropping the vinyl compound or both the vinyl compound and the polyhydric alcohol to the water-absorbent resin under stirring. In addition, when water is used for mixing, a water-insoluble fine particle powder or a surface-active agent may be allowed to coexist.

In the present invention, when the vinyl compound or both the vinyl compound and the polyhydric alcohol are added to the water-absorbent resin, the use of a mixing apparatus is preferable for effectively adding the vinyl compound or both the vinyl compound and the polyhydric alcohol. It is preferable that the mixing apparatus, as used, has a great mixing force to mix both materials uniformly and surely. Preferable examples of the above mixing apparatus include: cylinder type mixers, double-wall cone type mixers, V-character-shaped mixers, ribbon type mixers, screw type mixers, fluidized-furnace rotary disk type mixers, gas current type mixers, double-arm type kneaders, internal mixers, pulverizing type kneaders, rotary mixers, and screw type extruders, and more preferable ones are high-speed agitation type mixers.

In the present invention, after the addition of the vinyl compound or both the vinyl compound and the polyhydric alcohol to the water-absorbent resin, the resultant mixture needs to be heated, wherein the heating temperature is preferably 150° C. or higher. In the case where the heating temperature is lower than 150° C., the water-absorbing agent, excellent in the balance between the absorption capacities under no load and under a load, is not obtainable. The heating temperature is preferably in the range of 150~250° C. In the case where the temperature exceeds 250° C., the deterioration of the water-absorbent resin might occur to depress the performance of the water-absorbing agent, so caution is necessary.

The above heating treatment can be carried out using conventional dryers or heating-furnaces. Examples of the dryers include: channel type mixing dryers, rotary dryers, disk dryers, fluidized-bed dryers, gas-stream type dryers, and infrared dryers.

The above-mentioned production process of the present invention can give a water-absorbing agent which is excellent in both absorption capacities under no load and under a load and displays excellent absorption properties even if the weight percentage of the water-absorbent resin (resin concentration) is high when the water-absorbent resin is used for materials such as sanitary materials.

Next, an explanation is made on the water-absorbing composition according to the present invention.

The water-absorbing composition, according to the present invention, is characterized by comprising the above water-absorbent resin and the above vinyl ether compound. The production process for this water-absorbing composition is not especially limited, but a preferable one comprises the steps of mixing the water-absorbent resin and the vinyl ether compound and heating the resultant mixture.

The above water-absorbing composition has the advantage of displaying excellent absorption properties as above, because of containing the water-absorbent resin and the vinyl ether compound.

The water-absorbing composition of the present invention, in general, further comprises a fibrous material such as a hydrophilic fiber in addition to the water-absorbent resin and the vinyl ether compound. In the case where the water-absorbing composition, for example, comprises the water-absorbent resin, the vinyl ether compound, and the hydrophilic fiber, a constitution of the water-absorbing composition comprising a homogeneous mixture of the water-absorbent resin, the vinyl ether compound, and the hydrophilic fiber is, for example, preferable for sufficiently displaying effects of the present invention. Examples of such a constitution include: a constitution comprising a homogeneous mixture of the water-absorbent resin, the vinyl ether compound, and the hydrophilic fiber; a constitution comprising a layer of a homogeneous mixture of the water-absorbent resin, the vinyl ether compound, and the hydrophilic fiber and a layer of the hydrophilic fiber as laminated on the preceding layer; a constitution comprising a layer of a homogeneous mixture of the water-absorbent resin, the vinyl ether compound, and the hydrophilic fiber, a layer of the hydrophilic fiber, and the water-absorbent resin as is interposed between these layers; and further a constitution comprising the water-absorbent resin and the vinyl ether compound as are interposed between layers of the hydrophilic fiber; and still further a constitution comprising a sheet of the water-absorbent resin as shaped by combining a specific amount of water with the water-absorbent resin. Incidentally, the constitution of the water-absorbing composition is not limited to the above-mentioned examples thereof.

Examples of the above-mentioned fibrous material include hydrophilic fibers such as: cellulose fibers, for example, mechanical pulp, chemical pulp, semichemical pulp, digested pulp, as obtained from wood; and artificial cellulose fibers, for example, rayon, acetates. Among the above-exemplified fibers, cellulose fibers are preferable. In addition, the hydrophilic fibers may comprise synthetic fibers such as polyamides, polyesters, and polyolefins. Incidentally, the fibrous material is not limited to the above-exemplified fibers.

In addition, in the case where the ratio of the fibrous material such as the hydrophilic fiber in the water-absorbing composition is small, the water-absorbing compositions, namely, the hydrophilic fibers, may be allowed to adhere together using adhesive binders. If the hydrophilic fibers are allowed to adhere together, the strength and the shape retainability of the water-absorbing composition before or during the use thereof can be enhanced.

Examples of the above-mentioned adhesive binders include: heatsealable fibers such as polyolefin fibers (e.g., polyethylene, polypropylene, ethylene-propylene copolymers, 1-butene-ethylene copolymers); and adhesive emulsions. These adhesive binders may be used either alone respectively or in combinations with each other. The weight ratio of the hydrophilic fiber and the adhesive binder is preferably in the range of 50/50 to 99/1, more preferably 70/30 to 95/5, still more preferably 80/20 to 95/5.

The absorbent article is obtainable by interposing between a sheet (surface sheet) with liquid permeability and a sheet (back sheet) with liquid impermeability an absorbent layer which includes the above water-absorbing composition of the present invention. Then, because this absorbent article has the absorbent layer including the water-absorbing composition of the above-mentioned constitution, the absorbent article has the above-mentioned excellent absorption properties. As to the above absorbent article, it is permissible that a diffusion layer, helping a liquid diffuse and, for example, comprising nonwoven fabrics, cellulose, or crosslinked cellulose, is put on the upper face of the absorbent layer or on the back or upper face of the surface sheet.

Specified examples of the above absorbent article include sanitary materials such as disposable diapers, sanitary napkins, and so-called incontinence pads, but is not especially limited. Because the absorbent article has excellent absorption properties, it can prevent urine from leaking and can afford so-called dry feeling in the case where the absorbent article is, for example, a disposable diaper.

The above-mentioned sheet with liquid permeability (hereinafter referred to as liquid-permeable sheet) comprises a material that is permeable with aqueous liquids. Examples of the material forming the liquid-permeable sheet include: nonwoven fabrics, woven fabrics; porous synthetic resin films of polyethylene, polypropylene, polyester, polyamide. The above-mentioned sheet with liquid impermeability (hereinafter referred to as liquid-impermeable sheet) comprises a material that is impermeable with aqueous liquids. Examples of the material forming the liquid-impermeable sheet include: synthetic resin films of polyethylene, polypropylene, ethylene vinyl acetate, polyvinyl chloride; films of combined materials of these synthetic resins with nonwoven fabrics; films of combined materials of the above-mentioned synthetic resins with woven fabrics. Incidentally, the liquid-impermeable sheet may be permeable with vapor.

The constitution of the above absorbent layer is not especially limited if it has the above-mentioned water-absorbing composition. In addition, the process for producing the absorbent layer is not especially limited. Furthermore, the method for interposing the absorbent layer between the liquid-permeable sheet and the liquid-impermeable sheet, namely, the process for producing the absorbent article, is not especially limited.

In addition, in the present invention, various functions also can be given to the above water-absorbing composition by further adding thereto materials such as disinfectants, deodorants, antimicrobial agents, perfumes, various inorganic powders, foaming agents, pigments, dyes, hydrophilic short fibers, manure, oxidants, reductants, water, and salts.
(Effects and Advantages of the Invention):

The production process of the present invention can give a water-absorbing agent by a simple process, which agent is excellent in the absorption capacities under no load and under a load with good balance and can display excellent absorption properties even if the weight percentage of the water-absorbent resin (resin concentration) is high when the water-absorbent resin is used for materials such as sanitary materials.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to these examples. Incidentally, the performances of the water-absorbing agent were measured by the following methods:
(a) Absorption capacity under no load:
First, 0.2 g of water-absorbent resin (water-absorbing agent) was uniformly placed into a nonwoven-fabric-made bag (60 mm×60 mm) and then immersed into a 0.9 wt % aqueous sodium chloride solution (physiological saline). Sixty minutes later, the bag was drawn up and then drained at 250 G for 3 minutes with a centrifuge, and the resultant weight $W_1$ (g) of the bag was then measured. On the other hand, the same procedure was carried out using no water-absorbing agent, and the resultant weight $W_0$ (g) was measured. Thus, the absorption capacity (g/g) under no load was calculated by subtracting $W_0$ from $W_1$ and by dividing the resultant value by the weight (g) of the water-absorbing agent.

(b) Absorption capacity under load:

First, 0.9 g of water-absorbent resin (water-absorbing agent) is uniformly spread on a stainless wire net of 400 mesh (mesh size: 38 μm) as attached by fusion to the bottom of a plastic supporting cylinder of inner diameter 60 mm, on which a piston and a load are further mounted in sequence, wherein the piston has an outer diameter only a little smaller than 60 mm and makes no gap with the wall face of the supporting cylinder, but is not hindered from moving up and down, and the total weight of the piston and the load are adjusted to uniformly apply a load of 50 g/cm$^2$ to the water-absorbing agent. Then, the weight (Wa) of the resultant set of measurement apparatus is measured.

A glass filter of 90 mm is mounted inside a Petri dish of 150 mm, and a 0.9 wt % aqueous sodium chloride solution (physiological saline) is added up to the same level as the surface of the glass filter, on which a filter paper of diameter 90 mm is then mounted such that its entire surface will be wetted, and the excessive liquid is removed.

The above set of measurement apparatus is mounted on the above wet filter paper, thereby allowing the water-absorbing agent to absorb the liquid under a load. After 1 hour, the set of measurement apparatus is lifted, and its weight (Wb) is measured again. The absorption capacity under a load was determined by subtracting Wa from Wb and by dividing the resultant value by the weight (0.9 g) of the water-absorbing agent.

REFERENTIAL EXAMPLE 1

An aqueous solution was prepared by dissolving polyethylene glycol diacrylate (average molecular weight: 478) of 0.075 mol % as the internal-crosslinking agent into 5,500 g of an aqueous solution of sodium acrylate with a neutralization ratio of 75 mol % (monomer concentration: 38 weight %). Next, the resultant aqueous solution was degassed with a nitrogen gas for 30 minutes, and then supplied into a reaction vessel as prepared by capping a stainless-steel-made double-arm type kneader of 10 liters in capacity having two sigma type vanes and a jacket. While the aqueous solution was maintained at 20° C., the atmosphere inside the reaction system was further replaced with a nitrogen gas. Next, while the vanes were rotated, 29 g of a 10 weight % aqueous sodium persulfate solution and 1.6 g of a 10 weight % aqueous L-ascorbic acid solution were added to the above aqueous solution, so that a polymerization reaction got started 1 minute after, and that the reaction system reached the peak temperature 14 minutes after, when the resultant hydrogel polymer had a finely divided size of about 5 mm. Thereafter, the agitation was further continued, and the resultant hydrogel polymer was got out 60 minutes after the initiation of the polymerization.

The resultant finely divided hydrogel polymer was spread on a wire net of 300 μm in mesh size (50 mesh) and dried at 160° C. with hot air for 70 minutes. Then, the resultant dried product was pulverized with a laboratory pulverizer FDS-model (made by Miyako Bussan Co., Ltd.) and further classified with a screen of 850 μm in mesh size, thus obtaining crosslinked polyacrylic acid salt particles (A), which were the irregular pulverized shape and had an average particle diameter of 310 μm, a content of 10 weight % in terms of particles with a particle diameter less than 150 μm, and a water content of 6 weight %, and of which 75 mol % of the carboxyl groups were neutralized with the base.

Next, the resultant crosslinked polyacrylic acid salt particles (A) of the pulverized shape were classified with screens of 850 μm, 500 μm, 300 μm, and 150 μm in mesh size into primary particles, thus obtaining crosslinked polyacrylic acid salt particles (A1) with a particle diameter of 500~850 μm (but not including 850 μm), crosslinked polyacrylic acid salt particles (A2) with a particle diameter of 300~500 μm (but not including 500 μm), crosslinked polyacrylic acid salt particles (A3) with a particle diameter of 150~300 μm (but not including 300 μm), and crosslinked polyacrylic acid salt fine particles (A4) with a particle diameter less than 150 μm. Crosslinked polyacrylic acid salt particles (A2) had an absorption capacity of 33 g/g under no load and a water-soluble content of 10 weight %.

REFERENTIAL EXAMPLE 2

Polymerization was carried out in the same way as of Referential Example 1 except that: the neutralization ratio of the monomer was 71.3 mol %, the monomer concentration was 39 weight %, and the amounts of the polyethylene glycol diacrylate (average molecular weight: 478), the 10 weight % aqueous sodium persulfate solution, and the 10 weight % aqueous L-ascorbic acid solution were 0.085 mol %, 29 g, and 0.8 g respectively. As a result, the reaction system reached the peak temperature 15 minutes after. Thereafter, the agitation was further continued, and the resultant hydrogel polymer was got out 60 minutes after, and then dried at 170° C. with hot air for 70 minutes using the same dryer as that in Referential Example 1. Then, the resultant dried product was pulverized with the laboratory pulverizer FDS-model.

The resultant crosslinked polyacrylic acid salt particles (B) of the irregular pulverized shape (of which 71.3 mol % of the carboxyl groups were neutralized with the base) had an average particle diameter of 320 μm, a content of 8 weight % in terms of particles with a particle diameter less than 150 μm, and a water content of 5 weight %.

Next, the resultant crosslinked polyacrylic acid salt particles (B) of the pulverized shape were classified with screens of 850 μm, 500 μm, 300 μm, and 150 μm in mesh size, thus obtaining crosslinked polyacrylic acid salt particles (B1) with a particle diameter of 500~850 μm (but not including 850 μm), crosslinked polyacrylic acid salt particles (B2) with a particle diameter of 300~500 μm (but not including 500 μm), crosslinked polyacrylic acid salt particles (B3) with a particle diameter of 150~300 μm (but not including 300 μm), and crosslinked polyacrylic acid salt fine particles (B4) with a particle diameter less than 150 μm. Crosslinked polyacrylic acid salt particles (B2) had an absorption capacity of 34 g/g under no load and a water-soluble content of 10 weight %.

REFERENTIAL EXAMPLE 3

Four hundred grams of crosslinked polyacrylic acid salt fine particles (A4) with a particle diameter less than 150 μm, as obtained in Referential Example 1, were placed into Lödige Mixer M-5 (trademark; made by Gebrüder Lödige Maschinenbau GmbH) of 5 liters in capacity. While the high speed rotation was carried out with 60 Hz/100 V, 600 g of warm water as heated to 90° C. was injected from a funnel at once.

As a result, the crosslinked polyacrylic acid salt fine particles (A4) and the warm water gave a mixture within 10 seconds, and the entire contents of the mixer formed a gelling granulation product with a particle diameter of about 1~about 5 mm of the crosslinked polyacrylic acid salt fine particles and were stirred in the Lödige Mixer for 1 minute. Then, the resultant granulation product of the crosslinked polyacrylic acid salt fine particles was got out and then dried with a hot-air dryer until the water content reduced below 5 weight %. Next, the resultant dry product was pulverized with the same laboratory pulverizer as used in Referential Example 1, and the resultant pulverization product was classified into a particle diameter of 150~850 μm (but not including 850 μm), thus obtaining granular particles (C) of the crosslinked polyacrylic acid salt fine particles. Granular particles (C) displayed a water absorption capacity of 29 g/g under no load.

Next, granular particles (C) of the crosslinked polyacrylic acid salt fine particles were uniformly mixed with the crosslinked polyacrylic acid salt primary particles (A2) of 300~500 μm (but not including 500 μm) in particle diameter and the crosslinked polyacrylic acid salt primary particles (A3) of 150~300 μm (but not including 300 μm) in particle diameter ((A2) and (A3) were both obtained in Referential Example 1) in a ratio of 10 weight %/50 weight %/40 weight % as (C)/(A2)/(A3), thus obtaining water-absorbent resin (1) comprising a particle mixture of the crosslinked polyacrylic acid salt primary particles (of which 75 mol % of the carboxyl groups were neutralized with the base) with the granular particles (of which 75 mol % of the carboxyl groups were neutralized with the base) of the crosslinked polyacrylic acid salt fine particles.

REFERENTIAL EXAMPLE 4

Two hundred grams of crosslinked polyacrylic acid salt fine particles (B4) with a particle diameter less than 150 μm, as obtained in Referential Example 2, were placed into a mortar mixer of 5 liters in capacity made by Nishi Nihon Shikenki Seisakusho K.K. (the temperature of the vessel of 5 liters in capacity was maintained with a bath of 70° C.). While the agitation vanes of the mortar mixer were rotated at high speed, 300 g of warm water as heated to 90° C. was injected from a funnel at once. As a result the crosslinked polyacrylic acid salt fine particles (B4) and water gave a mixture within 10 seconds, and this mixture was stirred at high speed in the mortar mixer for 3 minutes. Then, the resultant granulation product of the crosslinked polyacrylic acid salt fine particles was got out and mounted on a wire net of 300 μm in mesh size, and then dried with a hot-air dryer until the water content reduced below 5 weight %. Next, the resultant dry product was pulverized with the same laboratory pulverizer as used in Referential Example 1, and the resultant pulverization product was classified into a particle diameter of 150~850 μm (but not including 850 μm), thus obtaining granular particles (E) of the crosslinked polyacrylic acid salt fine particles. Granular particles (E) displayed a water absorption capacity of 30 g/g under no load.

Next, granular particles (E) of the crosslinked polyacrylic acid salt fine particles were uniformly mixed with the crosslinked polyacrylic acid salt primary particles (B1) of 500~850 μm (but not including 850 μm) in particle diameter, the crosslinked polyacrylic acid salt primary particles (B2) of 300~500 μm (but not including 500 μm) in particle diameter, and the crosslinked polyacrylic acid salt primary particles (B3) of 150~300 μm (but not including 300 μm) in particle diameter ((B1), (B2) and (B3) were all obtained in Referential Example 2) in a ratio of 8 weight %/20 weight %/57 weight %/15 weight % as (E)/(B1)/(B2)/(B3), thus obtaining water-absorbent resin (2) comprising a particle mixture of the crosslinked polyacrylic acid salt primary particles (of which 71.3 mol % of the carboxyl groups were neutralized with the base) with the granular particles (of which 71.3 mol % of the carboxyl groups were neutralized with the base) of the crosslinked polyacrylic acid salt fine particles.

EXAMPLE 1

A vinyl compound solution, comprising 11.2 weight parts of triethylene glycol divinyl ether, 2.5 weight parts of isopropyl alcohol, and 15 weight parts of water, was added to 500 weight parts of water-absorbent resin (1) (as obtained in Referential Example 3) under stirring. The resultant mixture was put into a mortar mixer of 5 liters in capacity and then heated with an oil bath of 212° C. in oil temperature under stirring for 60 minutes, thus obtaining water-absorbing agent (1), according to the present invention, which was free from fine particles of 45 μm or below and had an absorption capacity of 31 g/g under no load and an absorption capacity of 20.7 g/g under a load.

EXAMPLE 2

A vinyl compound solution, comprising 11.2 weight parts of triethylene glycol divinyl ether, 2.5 weight parts of isopropyl alcohol, and 15 weight parts of water, was added to 500 weight parts of water-absorbent resin (1) (as obtained in Referential Example 3) under stirring. The resultant mixture was put into a mortar mixer of 5 liters in capacity and then heated with an oil bath of 160° C. in oil temperature under stirring for 90 minutes, thus obtaining water-absorbing agent (2), according to the present invention, which was free from fine particles of 45 μm or below and had an absorption capacity of 31 g/g under no load and an absorption capacity of 19.2 g/g under a load.

EXAMPLE 3

A vinyl compound solution, comprising 4.9 weight parts of ethylene glycol monovinyl ether, 2.5 weight parts of isopropyl alcohol, and 15 weight parts of water, was added to 500 weight parts of water-absorbent resin (2) (as obtained in Referential Example 4) under stirring. The resultant mixture was put into a mortar mixer of 5 liters in capacity and then heated with an oil bath of 212° C. in oil temperature under stirring for 55 minutes, thus obtaining water-absorbing agent (3), according to the present invention, which had an absorption capacity of 29 g/g under no load and an absorption capacity of 24.1 g/g under a load.

EXAMPLE 4

A (vinyl compound)-(polyhydric alcohol)-mixed solution, comprising 0.135 weight parts of triethylene glycol divinyl ether, 5 weight parts of propylene glycol, 4 weight parts of isopropyl alcohol, and 15 weight parts of water, was added to 500 weight parts of water-absorbent resin (1) (as obtained in Referential Example 3) under stirring. The resultant mixture was put into a mortar mixer of 5 liters in capacity and then heated with an oil bath of 212° C. in oil temperature under stirring for 35 minutes, thus obtaining water-absorbing agent (4), according to the present invention, which was free from fine particles of 45 μm or below and had an absorption capacity of 31 g/g under no load and an absorption capacity of 25.4 g/g under a load.

EXAMPLE 5

A (vinyl compound)-(polyhydric alcohol)-mixed solution, comprising 0.135 weight parts of triethylene glycol divinyl ether, 5 weight parts of propylene glycol, 4 weight parts of isopropyl alcohol, and 15 weight parts of water, was added to 500 weight parts of water-absorbent resin (2) (as obtained in Referential Example 4) under stirring. The resultant mixture was put into a mortar mixer of 5 liters in capacity and then heated with an oil bath of 212° C. in oil temperature under stirring for 50 minutes, thus obtaining water-absorbing agent (5), according to the present invention, which was free from fine particles of 45 µm or below and had an absorption capacity of 29.1 g/g under no load and an absorption capacity of 24.2 g/g under a load.

COMPARATIVE EXAMPLE 1

First, a dispersion was prepared by adding 100 weight parts of cyclohexane to 100 weight parts of water-absorbent resin (1) (as obtained in Referential Example 3). Next, a mixed solution, comprising 0.5 weight parts of vinyltrimethoxysilane, 1.1 weight parts of di-n-butyltin dilaurate, and 25 weight parts of water, was added to the above dispersion under stirring. The resultant mixture was heated at 70° C. under stirring for 3 hours, and then evaporated to dryness with a rotary evaporator, and then further dried under vacuum, thus obtaining comparative water-absorbing agent (1), which had an absorption capacity of 32 g/g under no load and an absorption capacity of 9.0 g/g under a load.

COMPARATIVE EXAMPLE 2

A vinyl compound solution, comprising 11.2 weight parts of triethylene glycol divinyl ether, 2.5 weight parts of isopropyl alcohol, and 15 weight parts of water, was added to 500 weight parts of water-absorbent resin (1) (as obtained in Referential Example 3) under stirring. The resultant mixture was put into a mortar mixer of 5 liters in capacity and then heated with an oil bath of 120° C. in oil temperature under stirring for 90 minutes, thus obtaining comparative water-absorbing agent (2), which had an absorption capacity of 33 g/g under no load and an absorption capacity of 9.5 g/g under a load.

COMPARATIVE EXAMPLE 3

A vinyl compound solution, comprising 2.5 weight parts of isopropyl alcohol and 15 weight parts of water, was added to 500 weight parts of water-absorbent resin (1) (as obtained in Referential Example 3) under stirring. The resultant mixture was put into a mortar mixer of 5 liters in capacity and then heated with an oil bath of 212° C. in oil temperature under stirring for 60 minutes, thus obtaining comparative water-absorbing agent (3), which had an absorption capacity of 33 g/g under no load and an absorption capacity of 8.8 g/g under a load.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A production process for a water-absorbing agent, characterized by comprising the steps of adding a vinyl compound to a water-absorbent resin and heating the resultant mixture to 150° C. or hiohger, wherein the vinyl compound is a vinyl ether compound.

2. A production process according to claim 1, wherein the water-absorbent resin has a carboxyl group as a functional group.

3. A production process according to claim 1, wherein 0.001~10 weight parts of the vinyl compound is added to 100 weight parts of the water-absorbent resin.

4. A production process for a water-absorbing agent, characterized by comprising the steps of adding a vinyl compound and a polyhydric alcohol to a water-absorbent resin and heating the resultant mixture.

5. A production process according to claim 4, wherein the vinyl compound is a vinyl ether compound.

6. A production process according to claim 4, wherein the water-absorbent resin has a carboxyl group as a functional group.

7. A production process according to claim 4, wherein 0.001~10 weight parts of the vinyl compound and 0.001~10 weight parts of the polyhydric alcohol are added to 100 weight parts of the water-absorbent resin.

8. A water-absorbing composition, comprising a water-absorbent resin and a vinyl ether compound, wherein the vinyl ether compound includes a $CH_2$=CH—O— group.

9. A production process for a water-absorbing agent, comprising the steps of adding a vinyl compound and a polyhydric alcohol to a water-absorbent resin and heating the resultant mixture, wherein the vinyl compound is a vinyl ether compound.

10. A water-absorbing composition produced by the process comprising the steps of mixing a water-absorbent resin and a vinyl ether compound and heating the resultant mixture, wherein the vinyl ether compound includes a $CH_2$=CH—O— group.

11. A production process for a water-absorbing agent, comprising the step of adding a vinyl compound to a water-absorbent resin to obtain a mixture, wherein the vinyl compound is a vinyl ether compound comprising a $CH_2$=CH—O— group, and wherein 0.001–10 weight parts of the vinyl compound is added to 100 weight parts of the water-absorbent resin.

12. A production process according to claim 11, and further comprising the step of heating the mixture.

13. A water-absorbing composition according to claim 8, wherein the vinyl ether compound comprises two or more $CH_2$=CH—O— groups.

14. A water-absorbing composition according to claim 10, wherein the vinyl ether compound comprises two or more $CH_2$=CH—O— groups.

15. A production process for a water-absorbing agent according to claim 11, wherein the vinyl ether compound comprises two or more $CH_2$=CH—O— groups.

* * * * *